US010039989B2

(12) United States Patent
McGregor

(10) Patent No.: US 10,039,989 B2
(45) Date of Patent: Aug. 7, 2018

(54) LIQUID POWERED APPARATUS

(71) Applicant: MAKE A DIFFERENCE EDUCATION SERVICES LIMITED, Hong Kong (HK)

(72) Inventor: Cory McGregor, Hong Kong (HK)

(73) Assignee: MAKE A DIFFERENCE EDUCATION SERVICES LIMITED, Hong Kong (HK)

( * ) Notice: Subject to any disclaimer, the term of this patent is extended or adjusted under 35 U.S.C. 154(b) by 0 days.

(21) Appl. No.: 15/502,503

(22) PCT Filed: Aug. 31, 2015

(86) PCT No.: PCT/IB2015/056593
§ 371 (c)(1),
(2) Date: Feb. 8, 2017

(87) PCT Pub. No.: WO2016/030867
PCT Pub. Date: Mar. 3, 2016

(65) Prior Publication Data
US 2017/0236451 A1    Aug. 17, 2017

(30) Foreign Application Priority Data
Aug. 29, 2014   (HK) .................................. 14108828.5

(51) Int. Cl.
A63H 23/00    (2006.01)
A63H 23/06    (2006.01)
(Continued)

(52) U.S. Cl.
CPC ............. *A63H 23/14* (2013.01); *A63H 23/04* (2013.01); *A63H 23/06* (2013.01); *A63H 29/14* (2013.01); *G09B 23/12* (2013.01)

(58) Field of Classification Search
CPC ........ A63H 23/04; A63H 23/06; A63H 29/14; A63H 23/14; G09B 23/12
(Continued)

(56) References Cited

U.S. PATENT DOCUMENTS 2,624,975 A * 1/1953 Belding ................. A63H 23/06
446/163
2,785,505 A * 3/1957 Tomak ................... A63H 23/04
446/163
(Continued)

FOREIGN PATENT DOCUMENTS

CN   1176836 A    3/1998
CN   2340043 Y    9/1999
(Continued)

OTHER PUBLICATIONS

International Search Report of PCT Patent Application No. PCT/IB2015/056593 dated Jan. 8, 2016.

*Primary Examiner* — Alexander Niconovich

(57) ABSTRACT

An apparatus or educational toy comprising a main body (120, 220, 320, 520) and a drive mechanism (140, 240, 340, 540), wherein the drive mechanism (140, 240, 340, 540) comprises a reservoir (142, 242, 342) for storing a driving liquid, a discharge outlet (144, 244a, 244b, 344, 544a, 544b) through which the driving liquid is discharged from the main body (120, 220, 320, 520) to generate a driving thrust, a liquid delivery path (146, 246a, 246b, 346) for delivering the driving liquid for a reservoir outlet (148, 348, 448) to the discharge outlet (144, 244a, 244b, 344, 544a, 544b), and a threshold setting device (147, 347); and wherein the threshold setting device (147, 347) sets a threshold thrust level so that the driving liquid is to pass from the reservoir (142, 242, 342) and discharged from the discharge outlet (144, 244a, 244b, 344, 544a, 544b) upon reaching the threshold thrust level during operation.

20 Claims, 6 Drawing Sheets

US 10,039,989 B2

Page 2

(51) Int. Cl.
*A63H 23/14* (2006.01)
*A63H 29/14* (2006.01)
*A63H 23/04* (2006.01)
*G09B 23/12* (2006.01)

(58) Field of Classification Search
USPC .......................................... 446/159, 160, 163
See application file for complete search history.

(56) References Cited

U.S. PATENT DOCUMENTS

| | | | | |
|---|---|---|---|---|
| 4,045,907 | A * | 9/1977 | Mumford | A63H 23/06 |
| | | | | 446/160 |
| 4,313,277 | A * | 2/1982 | Klawitter | A63H 23/06 |
| | | | | 446/163 |
| 4,455,782 | A * | 6/1984 | Seefluth | A63H 23/08 |
| | | | | 446/155 |
| 5,203,732 | A * | 4/1993 | Cusson | A63H 23/06 |
| | | | | 446/163 |
| 5,743,779 | A | 4/1998 | Nielsen | |
| 2011/0076910 | A1* | 3/2011 | Johnston | A63H 23/04 |
| | | | | 446/163 |

FOREIGN PATENT DOCUMENTS

| | | | |
|---|---|---|---|
| CN | 102044183 A | 5/2011 | |
| CN | 202795840 U | 3/2013 | |
| JP | 2005152160 A | 6/2005 | |

* cited by examiner

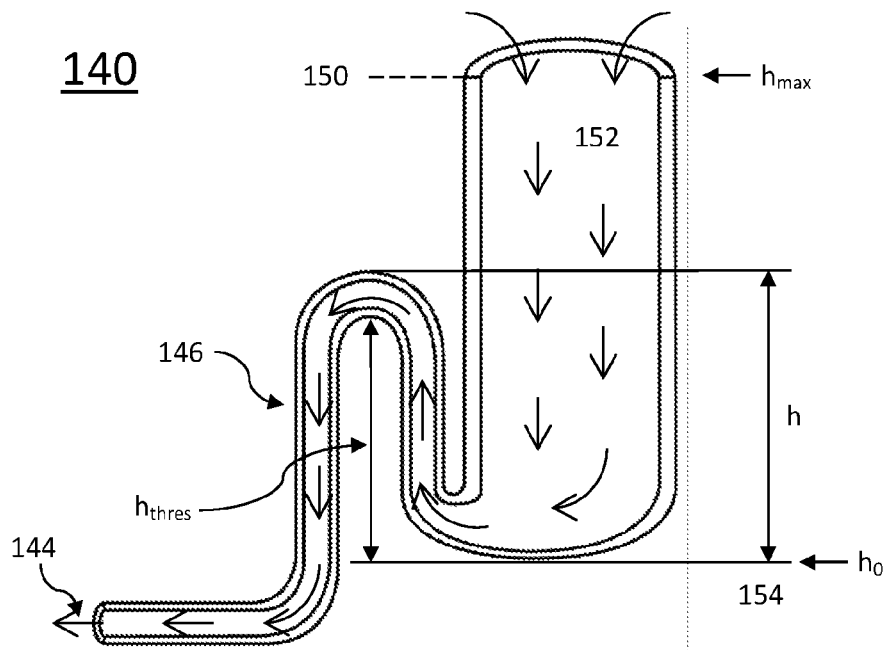
Fig. 1B
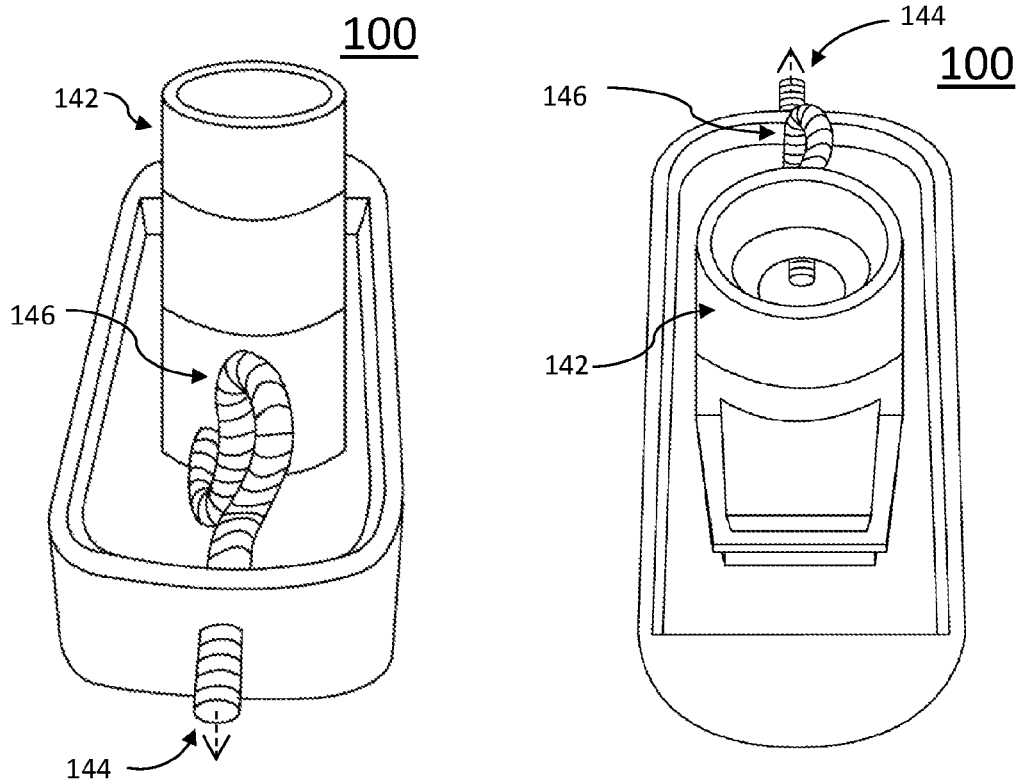
Fig. 2A
Fig. 2B

US 10,039,989 B2

LIQUID POWERED APPARATUS

FIELD

The present disclosure relates to liquid powered apparatus, including liquid powered vehicles and toys, and educational toys.

BACKGROUND

Liquid has an indefinite shape and adopts the shape of its container. Liquid flows from one location to another location due to force of gravity when there is a difference in potential energy and an available path. Liquid floats vehicles so that vehicle such as ships can travel across seas and oceans and from ports to ports. Liquid can be used as an energy source or energy generating source and can be stored. Hydroelectric power is an example of energy generated by liquid as a stored energy source. These and many other properties and characteristics of liquid are fascinating.

FIGURES

The disclosure will be described by way of example with reference to the accompanying Figures, in which:

FIG. 1B is longitudinal cross-sectional view of the example liquid drive mechanism of FIG. 1A, FIG. 2A is a top perspective view from one longitudinal end of another example apparatus;

FIG. 2B is a top perspective view from another longitudinal end of the example apparatus of FIG. 2A;

Figure 4:
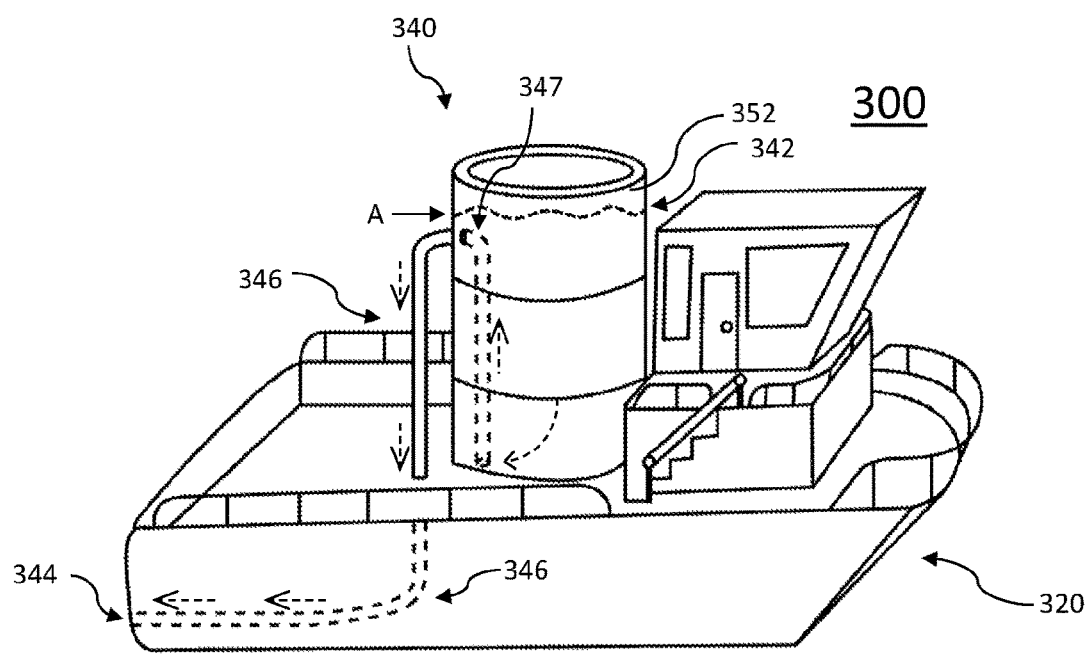
FIG. 4 is a side perspective view depicting an example apparatus according to the present disclosure, with dotted lines illustrating internal portions.
Figure 4A:
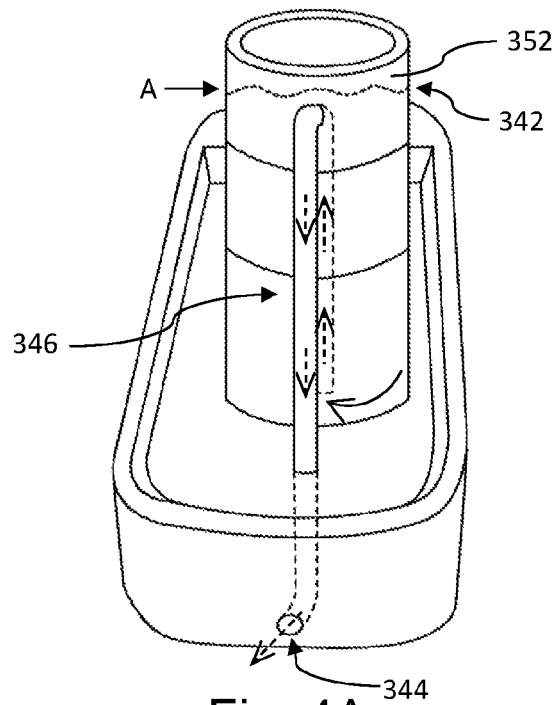
FIG. 4A is a schematic perspective view from one longitudinal end of the example apparatus of FIG. 4.
Figure 5:
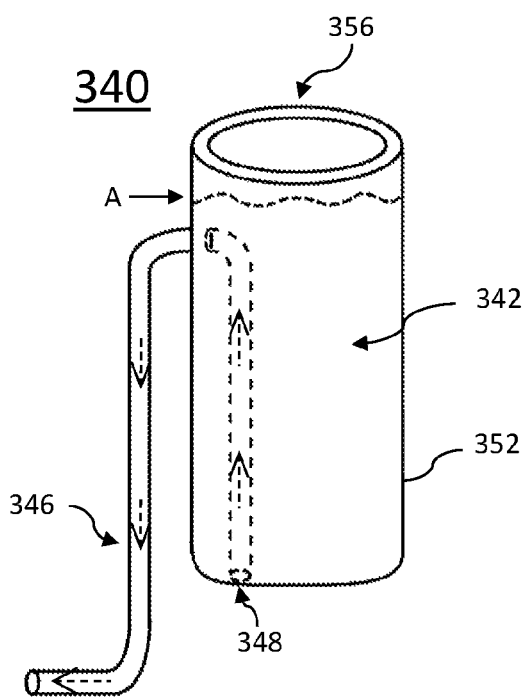
Figure 6:
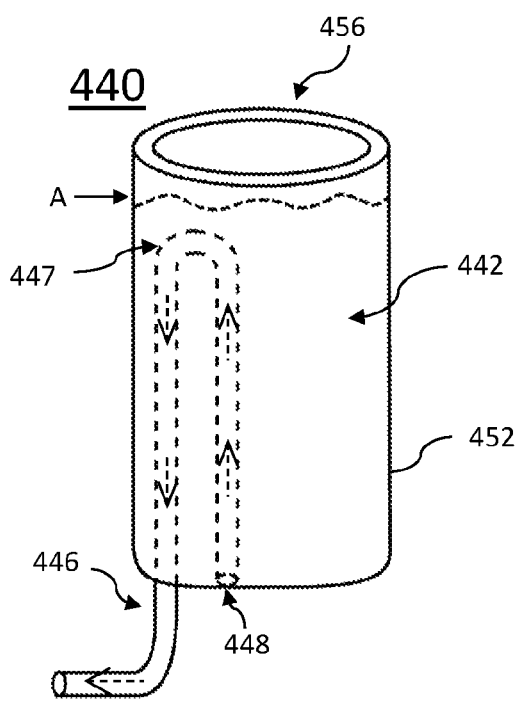
Figure 7A:
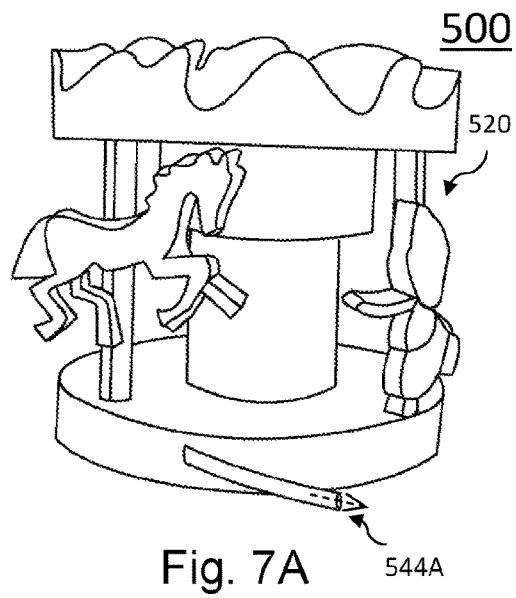
Figure 7B:
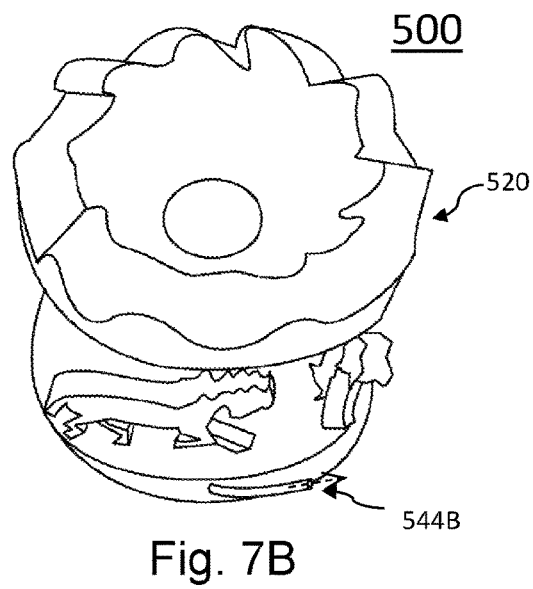
Figure 8:
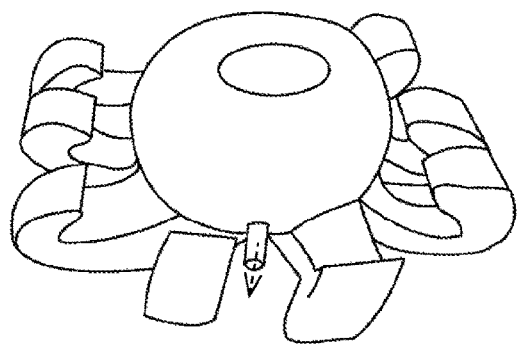
Figure 9:
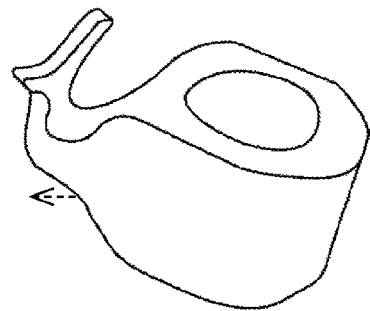
Figure 10:
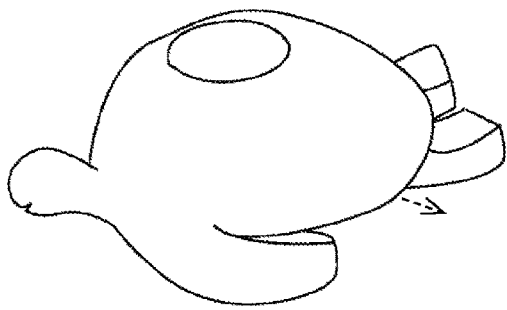
Figure 11:
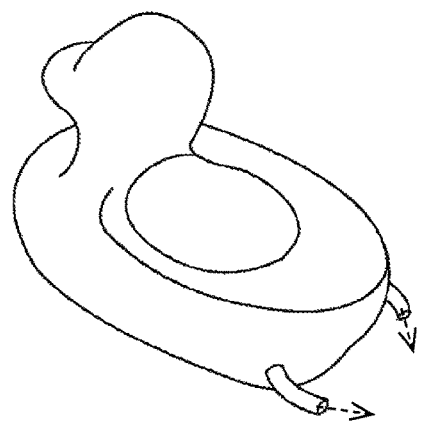

FIG. 5 is a perspective view showing an example liquid drive mechanism incorporated in the example apparatus of FIGS. 4 and 4A, FIG. 6 is a perspective view showing another example liquid drive mechanism, FIGS. 7A and 7B are schematic views depicting an example apparatus according to the present disclosure; and FIGS. 8-11 are schematic views depicting example articles according to the present disclosure.

DESCRIPTION

Figure 1:
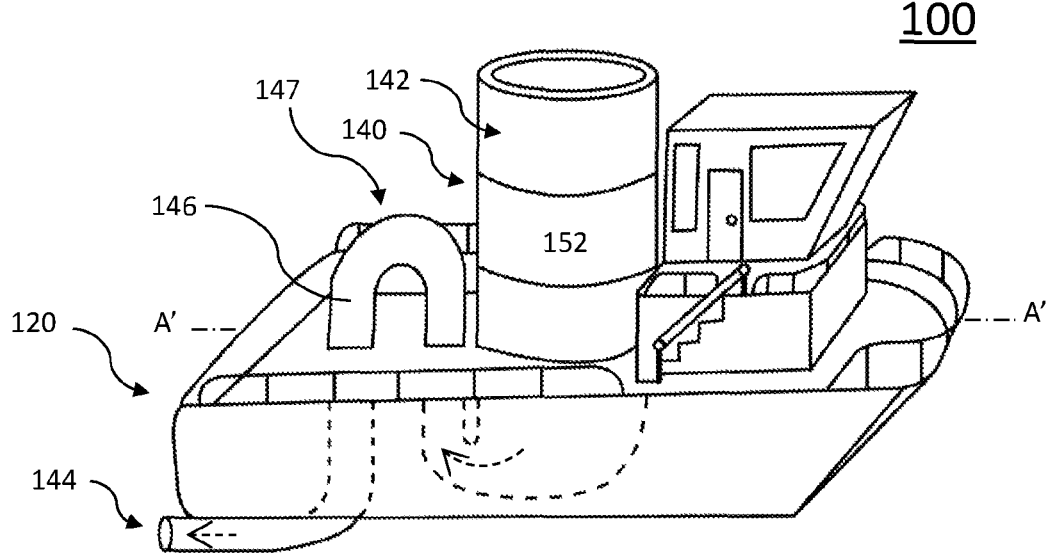
FIG. 1 is a side perspective view depicting an example apparatus according to the present disclosure, with dotted lines illustrating internal portions.

A toy boat 100 depicted in FIG. 1 comprises a main body 120 and a liquid drive mechanism carried on the main body 120. The main body 120 is made of plastic materials and has the shape of a boat. The main body 120 includes a hull which defines a bottom portion, side portions, and a deck portion. The side portions of the main body 120 collectively define a peripheral wall which surrounds the periphery of the bottom portion and which cooperates with the bottom portion to define a hollow hull compartment. The hollow compartment is water tight or substantially water tight to define a displacement volume which provides sufficient buoyance to float the toy boat 100 on liquid. The main body 120 is substantially symmetrical about a longitudinal axis A'-A'.

The liquid drive mechanism 140 comprises a reservoir 142 for holding or storing a driving liquid, a driving liquid discharge outlet 144 and a duct assembly 146 to define a liquid delivery path between the reservoir 142 and the discharge outlet 144. The reservoir 142 is formed to appear as a chimney of the toy boat 100 and extends upwardly from the hull compartment to project above the deck portion. The duct assembly 146 extends from the reservoir 142, projects rearwards towards the rear side of the hull, and exits at the discharge outlet 144 at bottom of the hull proximal the rear longitudinal end of the main body 120. The duct assembly 146 includes an inverted U-shape bent portion (or "U-bend" in short) 147 which is intermediate the reservoir 142 and the discharge outlet 144. The U-shape bent portion includes an upward extending tubular portion which extends vertically upwards and is proximal the reservoir, a downward extending tubular portion which extends vertically downwards and is distal from the reservoir, and a bent-portion which is intermediate and interconnects the top ends of the upward and the downward tubular portions. The liquid drive mechanism 140 is symmetrically or substantially symmetrically disposed along the longitudinal axis A'-A'.

Figure 1A:
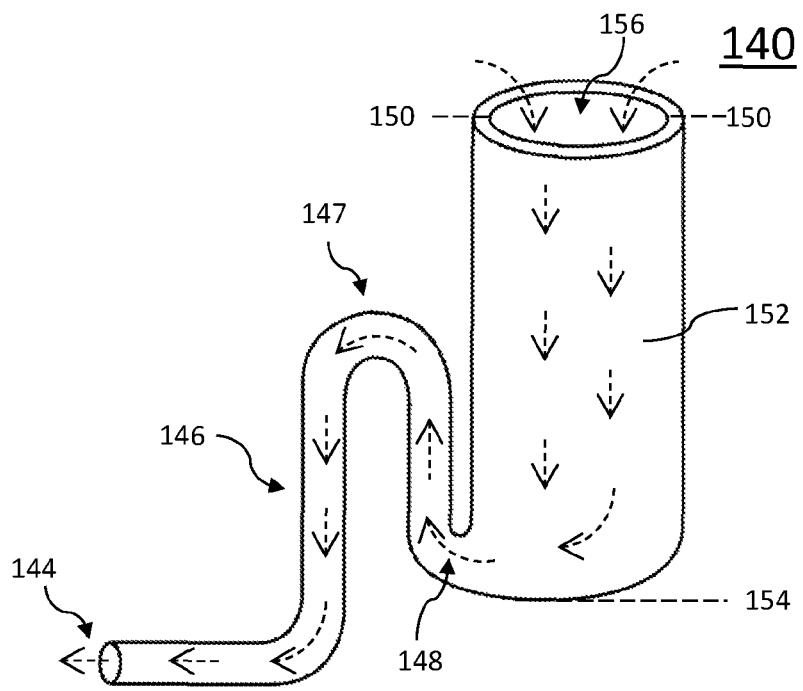
FIG. 1A is a perspective view showing an example liquid drive mechanism incorporated in the example apparatus of FIG. 1.

The example liquid drive mechanism 140 comprises a rigid housing which defines a reservoir 142, as depicted in FIGS. 1A and 1B. The rigid housing comprises a peripheral wall 152 which has a substantially cylindrical shape and extends in an axial direction to define a storage volume for holding a driving liquid during use or play. The reservoir 142 has a reservoir outlet 148 at or near the reservoir bottom 154. The reservoir outlet 148 defines a reservoir inlet aperture 156 through which liquid stored in the reservoir is fed to the liquid delivery path comprising the duct assembly 146 and discharge outlet 144. The reservoir 142 extends upwardly in an axial direction and has a top end 150 which is at a height of $h_{max}$ above the reservoir bottom 154. The axial direction corresponds to the direction of weight of water in the reservoir during use and is therefore in the direction of gravitational force. The height $h_{max}$ of the top end 150 corresponds to a level representing the maximum liquid storage capacity of the reservoir 142. The reservoir outlet 148 is located at a level $h_0$ which is proximal the reservoir bottom 154 of the reservoir. During use, the instantaneous height $h_i$ of the liquid column held by the reservoir can change between a maximum of $h_{max}$ and a minimum of $h_0$.

The reservoir inlet aperture 156 is to permit filling or refilling of driving liquid and is defined at the top end 150. The reservoir inlet aperture 156 aperture provides an opening to facilitate communication between the liquid stored in the reservoir and the atmospheric pressure.

In some embodiments, the top end 150 is covered and the peripheral wall 152 is perforated near the top end 150 to provide airing apertures.

The liquid delivery path includes a liquid inlet 148, the discharge outlet 144 and a duct assembly 146 interconnecting the liquid inlet 148 and the discharge outlet 144. The liquid inlet 148 defines a communication interface between the reservoir housing and the duct assembly 146 so that the liquid stored in the reservoir is passed into the duct assembly 146 via the liquid inlet 148.

As depicted in FIGS. 1A and 1B, the duct assembly 146 includes a first tubular portion which extends transversely away from the reservoir in a direction transversal to the axial direction, a second tubular portion which extends axially upwardly away from the reservoir bottom at the transversal end of the first tubular portion, a third tubular portion which extends arcuately to form a bend 147 having an inverted-U shape (or an "inverted U-shaped bend") at the upper axial end of the second portion, a fourth tubular portion which extends axially downwards from a distal end of the inverted-U shaped bend, and a fifth tubular portion extending from the lower axial end of the fourth tubular portion and extends transversely away from the reservoir until reaching the discharge outlet 144. In some embodiments, the duct assembly 146 is flexible.

The inverted U-shaped bend is to function as a threshold setting device so that, in use, liquid stored in the reservoir will not begin to flow to the discharge outlet 144 due to the weight of the liquid column inside the reservoir until the height of the liquid column exceeds a threshold height $h_{thres}$ set by the inverted U-shaped bend.

The liquid drive mechanism is installed on the boat shaped main body 120 with its axis of lateral symmetry substantially aligned with the longitudinal axis of the main body 120. In general, the liquid drive mechanism is symmetrical or substantially symmetrical about the axis of lateral symmetry of main body 120 for good balance. The reservoir is installed at about mid-point of the longitudinal axis of the main body 120 with the upper axial portion of the reservoir shaped to resemble the appearance of the chimney part of the main body 120 and the lower axial portion under the deck and extending towards the bottom. The duct assembly 146 is aligned with the longitudinal axis of the main body 120 and extends towards the back with the liquid discharge outlet 144 exposed at the back of the main body 120. As the lower portion of the reservoir (where the reservoir outlet is located) is underneath the deck, the first tubular portion of the liquid drive mechanism is also under the deck. The second tubular portion of the liquid drive mechanism extends axially upwards from under the deck to about half of the height of the chimney and joins the inverted U-shaped bend 147 so that the third tubular portion is partially underneath the deck and partially above. The fourth tubular portion of the liquid drive mechanism extends axially downwards from the outlet of the U-shaped bend 147 and re-enters the interior of the main body 120 and then bends to form the fifth tubular portion and extends until forming the liquid discharge outlet 144.

In the example of FIG. 1, the fifth or outlet portion of the duct assembly 146 passes through the bottom of the main body 120 at a location before reaching the back portion of the hull compartment and the discharge outlet 144 is underneath the bottom for discharging the driving liquid to produce a forward thrust and propel the main body 120 to move forward.

In the alternative example of FIGS. 1A and 1B, the outlet portion of the duct assembly 146 extends along the bottom of the main body 120 until reaching the back to form the discharge outlet 144 thereon. In both examples, the discharge outlet 144 is for discharging the driving liquid to propel the main body 120 produce a forward thrust and in a forward direction.

In the example of FIGS. 1 and 1A, the main body 120 is formed of a hard plastic material and the liquid drive mechanism 140 is securely mounted on the deck.

In some embodiments, the main body 120 is formed of a floatable material such as polystyrene and the liquid drive mechanism is securely mounted on a cavity formed by removal of the floatable material. In some embodiments, the reservoir is moulded of hard plastics. In other embodiments, the reservoir is integrally formed as a cavity on the floated material. In other embodiments, the reservoir comprises a portion formed of hard plastics to join with a portion integrally formed as a cavity on the floated material forming the main body. The duct assembly may be a tube such as a rigid tube formed from hard plastics or a flexible tube formed of soft plastics.

In an example use, the toy boat 100 is placed on a water bath and is kept afloat by the hollow main body 120. A user will fill up the reservoir with water (as an example of a driving liquid). When the water inside the reservoir is filled to exceed the threshold height, the weight of water above the threshold height will drive water out of the reservoir to exit through the discharge outlet 144 and the inverted U-bend. When the water begins to flow out of the duct assembly 146, suction generated by the water being discharged through the discharge outlet 144 will add to the weight of the water column to keep draw watering water out of the reservoir. When the water inside the reservoir drops to the threshold height, there is no more weight of water column above the threshold height to push water out through the inverted bend but the water remaining in the duct assembly and exiting through the liquid discharge outlet 144 will operate to draw water out of the reservoir through suctioning or siphoning. The suctioning will continue until the water level drops to below the level of the reservoir outlet or when the reservoir is empty.

In some embodiments, the discharge outlet 144 defining the exit nozzle of the duct assembly 146 is shaped so that the liquid is discharged like a liquid jet upon leaving the discharge outlet 144. In some embodiments, the discharge outlet 144 has a spread shape to facilitate formation of jet-like liquid streams. In some embodiments, the discharge outlet 144 is spread out in a horizontal direction which is transversal to the axial direction of the reservoir and transversal to the longitudinal direction of the main body. The horizontal spread of the discharge outlet 144 facilitates to spread the driving liquid. In some embodiments, the spread shape is also squeezed to increase the horizontal spread of the exiting liquid jet stream in the width-wise direction of the main body to enhance driving efficiency. In some embodiments, the discharge outlet 144 is squeezed, for example squeezed in the vertical direction, such that the spread shaped discharge outlet 144 has a smaller clearance area so that the speed of liquid exiting the discharge outlet 144 is higher than that moving in the duct assembly 146 due to Bernoulli's principle.

The size or dimension of the internal clearance of the duct assembly can be selected according to the desirable operation time, since a duct assembly having a smaller internal radius would have a smaller flow rate and requires a longer time to empty the reservoir. On the other hand, a duct assembly having a larger internal radius would have a larger flow rate and takes a shorter time to empty the reservoir.

In some embodiments such as the present, the portion of the duct assembly 144 between the U-bend 147 and the discharge outlet 144 comprises a flexible tube.

In some embodiments, additional U-bends are formed between the U-bend 147 and the discharge outlet 144 comprises flexible tubes.

In some embodiments, a user controllable stop valve is disposed between the U-bend 147 and the discharge outlet 144. The user controllable stop valve is operable by a user to stop liquid flow from the U-bend 147 and the discharge outlet 144 when desired. When the stop valve is closed to stop liquid discharge, liquid (such as water) stored in the portion of the duct assembly between the U-bend 147 and the discharge outlet 144 will draw liquid from the reservoir by siphoning even though the instantaneous liquid level is below top of the U-bend 147.

Figure 3:
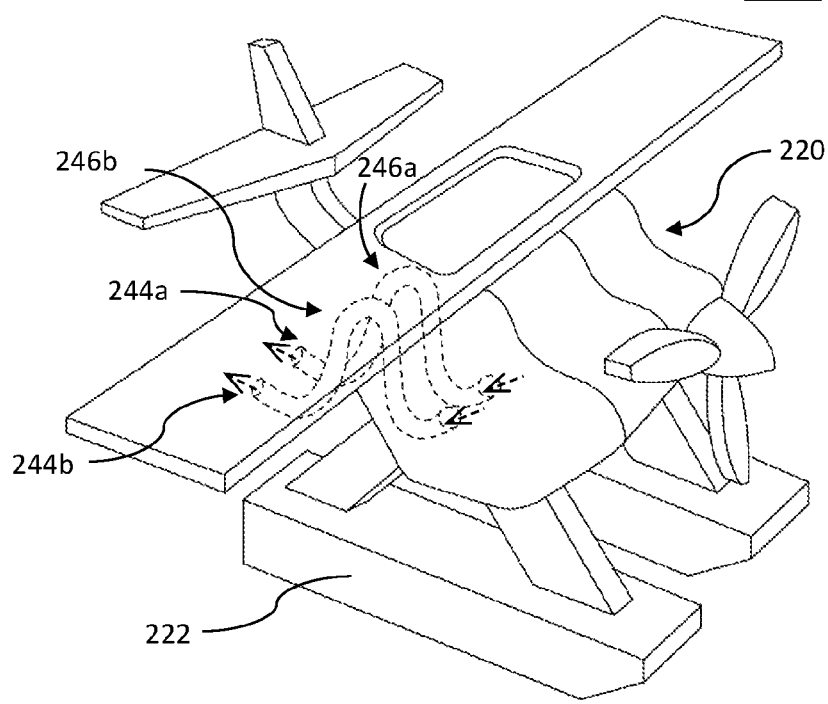
FIG. 3 is a schematic first perspective view depicting another example article according to the present disclosure, with dotted lines illustrating internal and/or invisible portions.
Figure 3A:
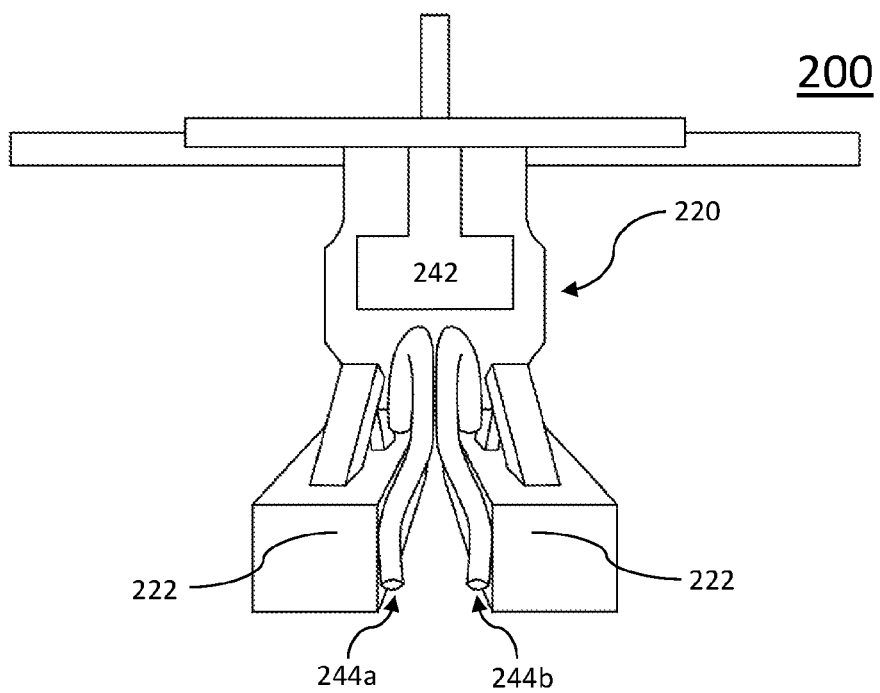
FIG. 3A is a schematic second perspective view showing one longitudinal end of the example article of FIG. 3.
Figure 3B:
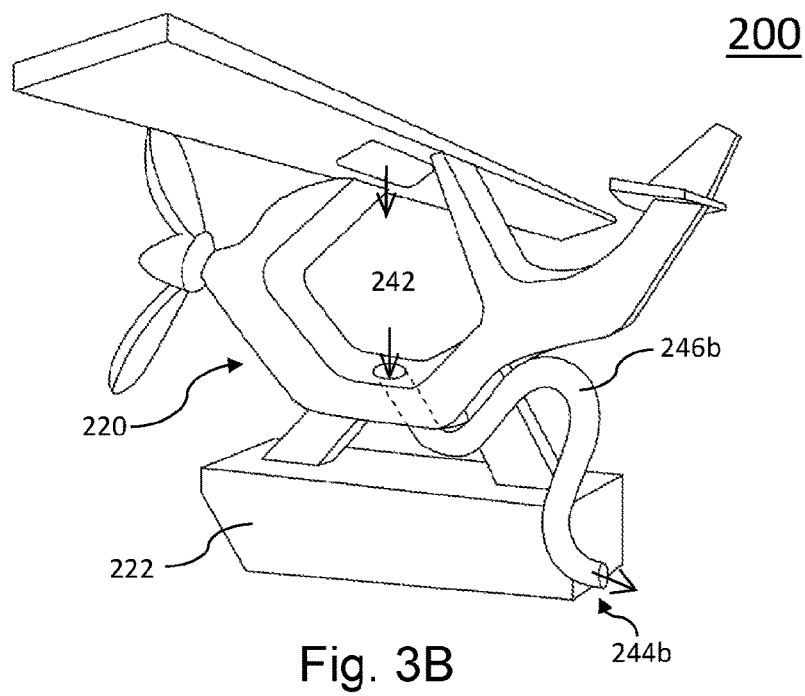
FIG. 3B is a longitudinal cross-sectional view of the article of FIG. 3 showing its liquid drive mechanism.

A floatable toy airplane 200 depicted in FIGS. 3, 3A and 3B comprises a main body 220 and a liquid drive mechanism carried on the main body 220. The main body 220 is formed into the shape of a fuselage of a floatable plane and is supported on a pair of elongate floatable bases 222. The elongate bases 222 are symmetrically disposed on two sides of the axis of lateral symmetry of the toy airplane 200 and extend in a longitudinal direction. The liquid drive mechanism 240 comprises a reservoir 242 for holding a driving liquid and a pair of duct assemblies 246a, 246b connected to the reservoir for discharging liquid stored in the reservoir as a propellant to drive the toy airplane 200 to move in a forward direction. The reservoir is formed inside the main body 220 and is elevated above the floatable bases 222 when the toy plane is floated on a water bath. The duct assemblies 246a, 246b are similar to the duct assembly 146 of the toy boat 100 except that each of the duct assemblies 246a, 246b declines from the elevated bottom of the reservoir to define discharge outlets 244a, 244b to appear near the bottom of the supporting bases 222. Due to the generally declining trend of the duct assemblies 246a, 246b, each of the tubular portions and the inverted U-shaped bend is at an inclination to the axial direction or the longitudinal direction as depicted in FIG. 3B. Compared to the single duct assembly arrangement of the toy boat 100, the liquid drive mechanism of this example comprises a distributed driving mechanism where the driving duct assemblies are distributed symmetrically on two sides of the axis of symmetry of the main body 220. With this distributed driving mechanism, the vehicle can turn by control of the volume flow rate at the individual discharge outlets 244a, 244b. Apart from the aforesaid, other features of the liquid drive mechanism are the same or substantially the same and the description above in relation to the liquid drive mechanism of the toy boat 100 is incorporated by reference herein and applied herein mutatis mutandis with numerals added by 100.

Use and operation of the toy airplane 200 follows substantially the same or similar principles and the description above in relation to operation of the toy boat 100 is incorporated by reference herein and applied herein mutatis mutandis to use and operation of the toy airplane 200 with appropriate modifications and numerals added by 100.

An example toy boat 300 depicted in FIG. 4 comprises a main body 320 and a liquid drive mechanism 340 carried on the main body 320. In the example toy boat 300 of FIG. 4, an example liquid drive mechanism 340 is deployed. The liquid drive mechanism 340 is a variant of the liquid drive mechanism 140 with the upwardly extending tubular portion of the duct assembly 346 inside the reservoir and the bend 347 extending through and across the peripheral wall 352 of the reservoir 342. The upwardly extending tubular portion of the duct assembly 346 has its upper end connected to bend 347 and its lower end to function as liquid inlet to the duct assembly 346. In this example, parts corresponding to the first tubular portion of the duct assembly 146 and the reservoir outlet 148 of the toy boat 100 are not present or dispensed with. The toy boat 300 is a variant of the toy boat 100 of FIG. 2A and the description herein in relation to the toy boat 300, including parts, functions, operations and interaction of the parts, is incorporated herein by reference with corresponding numerals added by 200.

In some embodiments such as the present, the top of the bend 347 is below the top of the reservoir 342. In such embodiments, liquid inside the reservoir 340 will begin to discharge automatically through the duct assembly 346 when the liquid inside the reservoir is above the top of the bend 347, and liquid discharge will continue even after the liquid inside the reservoir has dropped to below the top of the bend 347 due to siphoning discharge.

A liquid drive mechanism 440 depicted in FIG. 6 is a variant to the liquid drive mechanism 340. This variant liquid drive mechanism 440 is identical to the liquid drive mechanism 340 except that the entire bend 447 is inside the reservoir 442, and the downwardly extending tubular portion of the duct assembly 446 is also inside the reservoir 442.

In some embodiments, some or all of the first, second, third/bend, and fourth tubular portions of the duct assembly are positioned inside the reservoir and/or integrated with, preferably the lateral wall of the reservoir. The fourth or fifth portion might extend through the bottom end of the reservoir, such that the fifth portion extending from the lower axial end of the fourth tubular portion could then extend transversely away from the reservoir until reaching the discharge outlet.

An example apparatus 500 depicted in FIG. 7A and 7B comprises a main body 520 and a liquid drive mechanism carried on the main body 520. The main body 520 is in the form of a toy carousel having a circular base portion, and the liquid drive mechanism is of a type according to the present disclosure. The apparatus 500 is floatable and comprises a first liquid discharge outlet 544A and a second liquid discharge outlet 544B. The first 544A and the second 544B liquid discharge outlets are on opposite side, for example, diametrically opposite sides, of a central vertical axis of the main body 520 and are arranged to discharge liquid in a tangential direction to the periphery of the base portion. During operations when liquid is discharged while the toy carousel is afloat, discharge of liquid through first 544A and the second 544B liquid discharge outlets in opposite tangential directions about the central vertical axis will cause the main body to spin or rotate about the central vertical axis of the main body 520. The toy carousel 500 is a variant of the toy boat 100 and the description herein in relation to the toy boat 100, including parts, functions, operations and interaction of the parts, is incorporated herein, mutatis mutandis.

In some embodiments such as the present, the portion of the main body which is in contact with the floating liquid has a substantially circular cross section and the central vertical axis is coaxial with the axis of circular symmetry of the main body.

In some embodiments such as the present, the tangentially disposed first liquid discharge outlets are of same radial distance from the central vertical axis or the axis of circular symmetry of the main body.

In some embodiments, the tangentially disposed first liquid discharge outlets are at uniform spacing around the peripheral portion of the main body which is in contact with the floating liquid.

Example apparatus shown in FIGS. 8 to 11 include a floatable main body of various shapes and configurations and a liquid drive mechanism of a type according to the present disclosure.

According to the present disclosure, there is disclosed an apparatus comprising a main body and a drive mechanism. The drive mechanism comprises a reservoir for storing a driving liquid, a discharge outlet through which the driving liquid is discharged from the main body to generate a driving thrust, a liquid delivery path for delivering the drive liquid from a reservoir outlet to the discharge outlet, and a threshold setting device. Wherein the threshold setting device sets a threshold thrust level so that the driving liquid is to pass from the reservoir and discharged from the discharge outlet upon reaching the threshold thrust level during operation. In some embodiments, the apparatus is a vehicle such as a toy boat or toy water plane.

The drive mechanism operates on stored gravitational energy and is environmentally friendly.

The drive mechanism may be arranged such that the driving liquid is driven out of the reservoir and discharged through the discharge outlet by weight of the driving liquid in the reservoir when the driving liquid in the reservoir is at a level exceeding or corresponding to the threshold thrust level and by suction generated in the liquid delivery path due to the driving liquid exiting the liquid delivery path when the level of the driving liquid in the reservoir drops below the threshold thrust level.

The drive mechanism is advantageous in that it helps to illustrate several physical phenomena through a single apparatus through visually inspiring operation during different stages of operation.

The reservoir may have an upper end which defines a maximum liquid level corresponding to the maximum storage volume of the reservoir and a lower end defined by the reservoir bottom, and wherein the height of the driving liquid above the reservoir bottom decreases from a first level (A) corresponding to the threshold thrust level and above to a second level corresponding to below the threshold thrust level or to the reservoir bottom during use, the reservoir outlet being located at the second level.

Features set out in the claims hereto (jointly and severally where appropriate) are to form part of this disclosure and are incorporated herein by reference.

Arrows shown in the Figures hereto are for indicating, schematic, liquid flow directions during operations and are not normally visible, for the avoidance of doubt or confusion.

While the disclosure has been explained with reference to examples described herein, it should be appreciated that the examples are non-limiting and are to assist understanding of the disclosure without loss of generality. For example, the main body may be made in the form of any floatable vehicles of appropriate materials without loss of generality. While water has been used as a propellant, it should be appreciated that other liquids can be used.

The invention claimed is:

1. A liquid powered apparatus or an educational toy comprising a main body and a drive mechanism, wherein the drive mechanism comprises:
   a reservoir for storing a driving liquid, the reservoir having a reservoir bottom and a reservoir outlet and defining an axial direction,
   a discharge outlet through which the driving liquid is discharged from the main body to generate a driving thrust; and
   a liquid delivery path comprising a duct assembly for delivering the drive liquid from a reservoir outlet to the discharge outlet, wherein the duct assembly comprises a bend having a top portion which is to function as a threshold setting device and which sets a threshold height above the reservoir bottom;
   wherein the driving liquid inside the reservoir can change between a maximum height which is above the top portion of the bend and a minimum height which is below the top portion of the bend; and
   wherein the drive mechanism is arranged such that the driving liquid stored in the reservoir will not begin to flow through the bend to the discharge outlet due to weight of the driving liquid inside the reservoir until the driving liquid is at a height which is at or above the threshold height,
   wherein the driving liquid is to be driven out of the reservoir outlet by weight of the driving liquid in the reservoir to the duct assembly and discharged from the discharge outlet when the driving liquid inside the reservoir is at or above the threshold height set by the bend or is above the top portion of the bend, and
   wherein discharge of the driving liquid from the reservoir is to continue by siphoning discharge after the driving liquid inside the reservoir has dropped to below the top portion of the bend.

2. The apparatus or educational toy according to claim 1, wherein the bend is intermediate the reservoir and the discharge outlet and includes an upwardly extending tubular portion proximal to the reservoir, a downwardly extending tubular portion distal to the reservoir, and a bent portion which is intermediate and interconnects top ends of the upwardly extending tubular portion and the downwardly extending tubular portion.

3. The apparatus or educational toy according to claim 1, wherein the duct assembly includes an upwardly extending tubular portion which extends axially upwardly and away from the reservoir bottom, a tubular bent portion which extends arcuately at an upper axial end of the upwardly extending tubular portion to form the bend, and a downwardly extending tubular portion which extends downwards from a distal end of the bend; and wherein the bent portion is an inverted U-shaped bent portion having an inverted-U shape.

4. The apparatus or educational toy according to claim 3, wherein the duct assembly is arranged such that when the height of the driving liquid inside the reservoir drops to the threshold height so that there is no more weight of driving liquid column above the threshold height to push the driving liquid out through the inverted-U shaped bent portion, the driving liquid remaining in the duct assembly and exiting through the liquid discharge outlet is to operate to draw the driving liquid out of the reservoir through suctioning or siphoning.

5. The apparatus or educational toy according to claim 1, wherein the duct assembly includes a first tubular portion which extends transversely away from the reservoir in a direction transversal to the axial direction, a second tubular portion which extends upwardly away from the reservoir bottom at a transversal end of the first tubular portion, a third tubular portion which extends arcuately to form the bend at an upper axial end of the second tubular portion, a fourth tubular portion which extends axially downwards from a distal end of the bend, and a fifth tubular portion extending from the lower axial end of the fourth tubular portion and extends transversely away from the reservoir until reaching the discharge outlet; and wherein the bend is an inverted U-shaped bent portion having an inverted-U shaped bend which is to function as the threshold setting device.

6. The apparatus or educational toy according to claim 5, wherein the first tubular portion, the second tubular portion, the third tubular portion, and the fourth tubular portion are inside the reservoir.

7. The apparatus or educational toy according to claim 1, wherein the duct assembly comprises a user controllable stop valve between the bend and the discharge outlet, and wherein the user controllable stop valve is operable by a user to stop liquid flow from the bend and the discharge outlet; and wherein the bend is an inverted U-shaped bent portion.

8. The apparatus or educational toy according to claim 1, wherein the reservoir extends upwardly in the axial direction and has an upper end which defines a maximum liquid level corresponding to the maximum storage volume of the reservoir and a lower end which defines the reservoir bottom, and wherein the height of the driving liquid above the reservoir bottom decreases from a first level corresponding to the threshold height and above to a second level which is below the threshold height or corresponds to the reservoir bottom during use, the reservoir outlet the discharge inlet being located at the second level.

9. The apparatus or educational toy according to claim 8, wherein the bend is an inverted-U shaped bent portion having a top portion which is above the bottom of the reservoir bottom and below the upper end of the reservoir.

10. The apparatus or educational toy according to claim 9, wherein the driving liquid inside the reservoir is to begin to discharge automatically through the duct assembly when the driving liquid inside the reservoir is at a level above the top portion of the inverted-U shaped bent portion, and wherein liquid discharge is to continue after the driving liquid inside the reservoir has dropped to a height below the top portion of the inverted-U shaped bent portion due to siphoning discharge.

11. The apparatus or educational toy according to claim 8, wherein the bend is an inverted-U shaped bent portion which is inside the reservoir or extends through and across the reservoir.

12. The apparatus or educational toy according to claim 1, wherein the liquid delivery path is shaped such that the driving liquid is to be drawn out of the reservoir by siphoning or by suction after the driving liquid has started to flow out through the liquid delivery path to exit at the discharge outlet.

13. The apparatus or educational toy according to claim 1, wherein the liquid delivery path is formed into a shape such that the driving liquid is to be drawn out of the reservoir by siphoning after the driving liquid has started flowing from the reservoir to the discharge outlet even when the driving liquid remaining in the reservoir has dropped to below the threshold height.

14. The apparatus or educational toy according to claim 1, wherein the drive mechanism comprises a first discharge outlet and a second distributed outlet which are disposed on two diametrically opposite sides of an axis of symmetry of the main body to provide a distributed driving source, the axis of symmetry being a central vertical axis of the main body; and wherein the first discharge outlet and the second distributed outlet are positioned to discharge liquid in tangential directions so that the main body is to spin about the central vertical axis during operations.

15. The apparatus or educational toy according to claim 14, wherein the main body has a circularly symmetrical portion which is in contact with a floating liquid on which the body is to float during operations, and the circularly symmetrical portion has an axis of circular symmetry; and wherein the central vertical axis is coaxial with the axis of circular symmetry.

16. The apparatus or educational toy according to claim 1, wherein the discharge outlet has a spread shape extending in a width-wise direction of the main body.

17. The apparatus or educational toy according to claim 1, wherein the main body is made of polystyrene, or plastics.

18. The apparatus or educational toy according to claim 1, wherein the main body is formed into a shape of a toy, including toy boat, toy airplane, carousel, and aquatic comprising octopus, whale, turtle, duck.

19. The apparatus or educational toy according to claim 1, wherein the duct assembly is a rigid tube or a flexible tube.

20. The apparatus or educational toy according to claim 1, wherein the main body is formed into a shape of a ship and the reservoir is formed as a chimney of the ship.

\* \* \* \* \*